(12) United States Patent
Pendray et al.

(10) Patent No.: US 6,989,967 B2
(45) Date of Patent: Jan. 24, 2006

(54) SLIDER HAVING A TRAILING BEARING PAD ADJACENT TO A RECESSED AREA

(75) Inventors: John R. Pendray, Edina, MN (US); Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 111 days.

(21) Appl. No.: 10/376,864

(22) Filed: Feb. 28, 2003

(65) Prior Publication Data

US 2004/0027724 A1 Feb. 12, 2004

Related U.S. Application Data

(60) Provisional application No. 60/401,360, filed on Aug. 6, 2002.

(51) Int. Cl.
| G11B 5/60 | (2006.01) |
| G11B 15/64 | (2006.01) |
| G11B 17/32 | (2006.01) |
| G11B 21/20 | (2006.01) |

(52) U.S. Cl. .................................................. 360/236.5
(58) Field of Classification Search ............. 360/236.5, 360/236.3, 235.1, 235.7, 235.5, 235.4, 234.3, 360/234, 230, 237, 236.9, 236.2
See application file for complete search history.

(56) References Cited

U.S. PATENT DOCUMENTS

| 4,802,042 A | 1/1989 | Strom ...................... 360/236.3 |
| 4,893,203 A | 1/1990 | Ezaki et al. .............. 360/234.3 |
| 5,097,369 A | 3/1992 | Matsuzaki .................. 360/236 |
| 5,196,973 A | 3/1993 | Chapin et al. ........... 360/236.1 |
| 5,200,868 A | 4/1993 | Chapin et al. ........... 360/236.1 |
| 5,218,494 A | 6/1993 | Chapin et al. ........... 360/236.1 |
| 5,267,109 A | 11/1993 | Chapin et al. ........... 360/236.5 |
| 5,820,770 A | 10/1998 | Cohen et al. ................. 216/22 |
| 5,872,684 A | 2/1999 | Hadfield et al. ......... 360/235.4 |
| 5,872,685 A | 2/1999 | Park et al. ............... 360/236.1 |
| 6,122,148 A * | 9/2000 | Hamaguchi et al. ..... 360/234.3 |
| 6,130,809 A | 10/2000 | Santini ....................... 360/317 |
| 6,470,565 B1 * | 10/2002 | Sasaki ..................... 29/603.12 |
| 2002/0041467 A1 | 4/2002 | Boutaghou et al. ...... 360/236.1 |
| 2004/0061974 A1 * | 4/2004 | Macken et al. .......... 360/235.1 |

FOREIGN PATENT DOCUMENTS

GB    2393563 A  *  3/2004

* cited by examiner

*Primary Examiner*—Julie Anne Watko
(74) *Attorney, Agent, or Firm*—Westman, Champlin & Kelly, P.A.; Todd R. Fronek

(57) ABSTRACT

A head slider that includes a substrate having a leading surface, a trailing surface, first and second side edges, a back surface and a disc-facing surface opposite the back surface is provided. The disc-facing surface includes a bearing plane and a recessed area recessed from the bearing plane. An end layer is attached to the trailing surface of the substrate. The end layer includes a bearing pad formed substantially solely on the end layer that is generally parallel to the bearing plane. The bearing pad is positioned adjacent to and rearward of the recessed area to receive fluid flow from the recessed area.

24 Claims, 8 Drawing Sheets

SLIDER HAVING A TRAILING BEARING PAD ADJACENT TO A RECESSED AREA

CROSS-REFERENCE TO RELATED APPLICATION

This application claims priority from U.S. Provisional Application 60/401,360 filed on Aug. 6, 2002 for inventors John Pendray and Zine-Eddine Boutaghou and entitled "MICRO-ALUMINA AND MICRO-TRANSDUCER PAD AIR BEARING DESIGNS" and U.S. application Ser. No. 09/884,796 filed on Jun. 19, 2001 for inventor Zine-Eddine Boutaghou and entitled "EXTENDED ALUMINA BASECOAT ADVANCED AIR BEARING SLIDER".

FIELD OF THE INVENTION

The present invention relates to data storage systems and, more particularly, to a disc head slider for communicating with a recording medium in a disc drive.

BACKGROUND OF THE INVENTION

Disc drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g., air) bearing disc head sliders. The sliders carry transducers, which write information to and read information from the disc surfaces.

An actuator mechanism moves the sliders from track-to-track across the surfaces of the discs under control of electronic circuitry. The actuator mechanism includes a track accessing arm and a suspension for each head gimbal assembly. The suspension includes a load beam and a gimbal. The load beam provides a load force which forces the slider toward the disc surface. The gimbal is positioned between the slider and the load beam, or is integrated in the load beam, to provide a compliant connection that allows the slider to pitch and roll and assume an orientation relative to the disc that balances the hydrodynamic forces that support the slider.

The slider includes a bearing surface, which faces the disc surface. As the disc rotates, the disc drags air under the slider and along the bearing surface in a direction approximately parallel to the tangential velocity of the disc. As the air passes beneath the bearing surface, air compression along the air flow path causes the air pressure between the disc and the bearing surface to increase, which creates a hydrodynamic lifting force that counteracts the load force and causes the slider to lift and fly above or in close proximity to the disc surface.

As recording density on discs increases, recording heads fly closer to the disc surface to maintain resolution between adjacent data tracks. Thus, the physical separation between the slider and the disc surface at the recording head is an important parameter to disc drive performance. Prior art sliders provide a focused pressure peak on the slider substrate near the transducer region to minimize variation of the physical separation, or "fly height." Other systems use active or passive fly height control mechanisms to minimize variation. During operation of the drive, however, elements near the trailing edge of the slider can experience recession due in part to thermal or manufacturing effects that disrupt the overall performance of the disc drive. These elements can include a basecoat layer, overcoat layer, transducer pole tips and substrate features. If the basecoat layer, overcoat layer, and pole tips become recessed relative to the air bearing surface features of the slider, the effective fly height at the pole tips will increase, causing degradation in read/write performance. Additionally, manufacturing variations in the shape of the slider and the geometry of the bearing surfaces may effect fly height and fly height modulation.

A disc head slider is therefore desired that reduces sensitivity of the fly height and fly height modulation to manufacturing variations and recession of elements on the slider. Embodiments of the present invention provide solutions to these and other problems, and offer other advantages over the prior art.

SUMMARY OF THE INVENTION

One embodiment of the present invention is directed to a head slider that includes a slider substrate having a leading surface, a trailing surface, first and second side edges, a back surface and a disc-facing surface opposite the back surface. The disc-facing surface includes a bearing plane and a recessed area recessed from the bearing plane. An end layer is attached to the trailing surface of the slider body. The end layer includes a bearing pad formed substantially solely on the end layer that is generally parallel to the bearing plane. The bearing pad is positioned adjacent to and rearward of the recessed area to receive fluid flow from the recessed area.

In another embodiment, a head slider includes a front portion including a first material and having a bearing plane and a recessed area recessed from the bearing plane. A rear portion is attached to the front portion and includes a second material different from the first material. The rear portion also includes a pad positioned adjacent to and protruding from the recessed area to receive airflow from the recessed area.

Also, a head slider has a slider body that includes a leading edge, a trailing edge, a back surface and a disc-facing surface opposite the back surface. The disc-facing surface has a bearing plane. A recessed convergent channel is positioned on the disc-facing surface and recessed from the bearing plane. The convergent channel includes an end open to fluid flow and side walls coplanar with the bearing plane. A basecoat/transducer/overcoat layer is attached to the slider body at the trailing edge. Additionally, a pad is formed substantially solely on the basecoat/transducer/overcoat layer and coplanar with the bearing plane. The pad is closed to fluid flow from the recessed convergent channel. Other features and benefits that characterize embodiments of the present invention will be apparent upon reading the following detailed description and review of the associated drawings.

DETAILED DESCRIPTION OF ILLUSTRATIVE EMBODIMENTS

Figure 1:
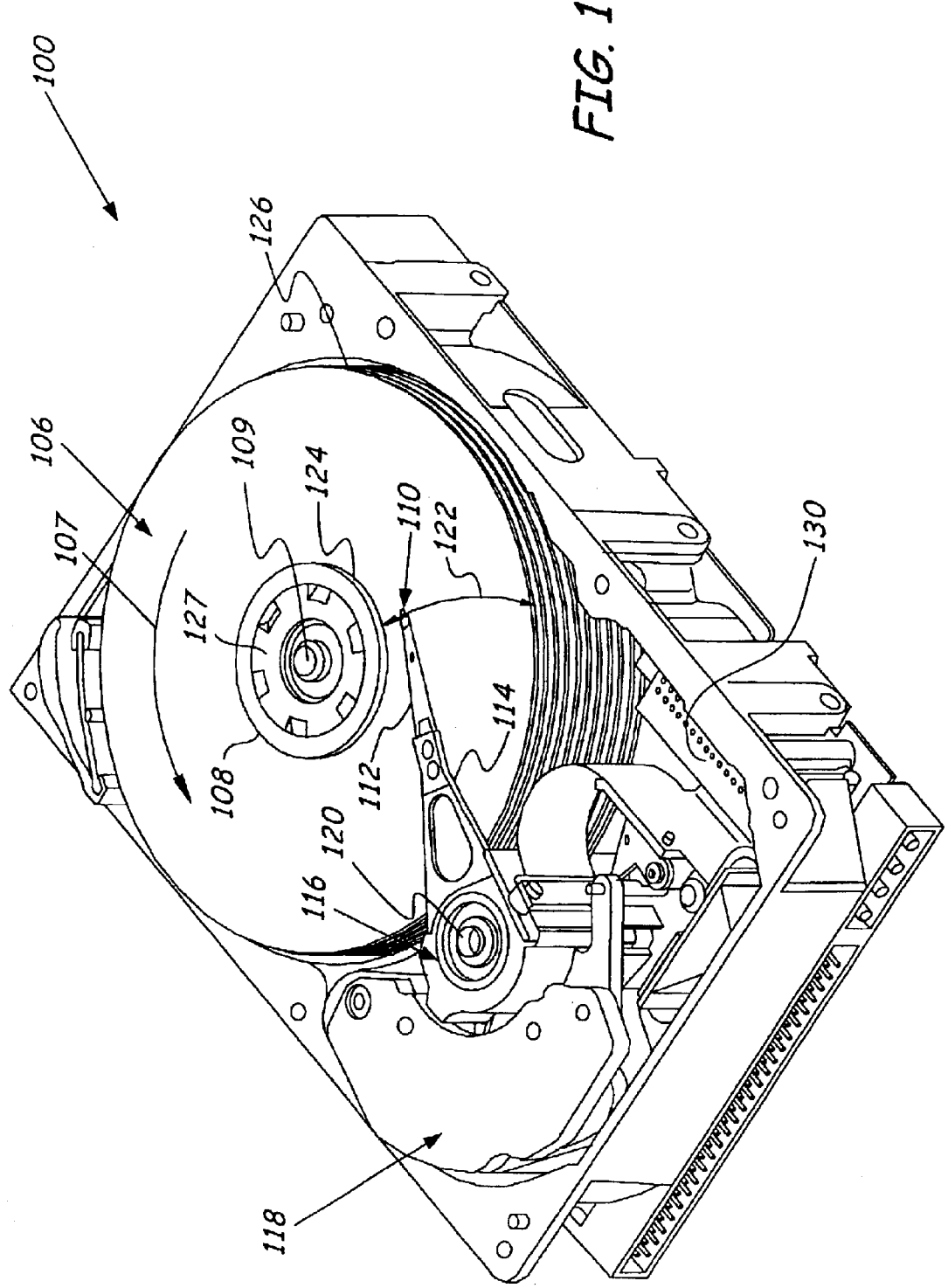
FIG. 1 is a perspective view of a disc drive in which the present invention is useful.

FIG. 1 is a perspective view of a disc drive 100 in which the present invention is useful. Disc drive 100 can be configured as a traditional magnetic disc drive, a magneto-optical disc drive or an optical disc drive, for example. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 130. Other types of actuators can also be used, such as linear actuators.

During operation, as discs 107 rotate, the discs drag air under the respective sliders 110 and along their bearing surfaces in a direction approximately parallel to the tangential velocity of the discs. As the air passes beneath the bearing surfaces, air compression along the air flow path causes the air pressure between the discs and the bearing surfaces to increase, which creates a hydrodynamic lifting force that counteracts the load force provided by suspensions 112 and causes the sliders 110 to lift and fly above or in close proximity to the disc surfaces.

Sliders typically include a substrate or front portion, having leading and trailing surfaces, first and second side surfaces, a back surface and a disc-facing surface opposite the back surface. An end layer, or rear portion is attached to the trailing surface of the substrate. The end layer includes a basecoat layer, a transducer layer and an overcoat layer attached to the substrate. A number of surface features are defined on the disc-facing surface of the slider for generating a desired pressure profile between the slider and the disc under various operating conditions. For example, sliders are often designed to have an operational pitch where the trailing end flies in closer proximity to the disc surface than the leading end. Thus, the read/write transducer is typically fabricated on or near the trailing edge of the disc facing surface to obtain the greatest read and write resolution. With an operational pitch, surface features near the trailing edge, including the pole tips of the transducer, can experience recession in height over time due to thermal and other effects.

Figure 2:
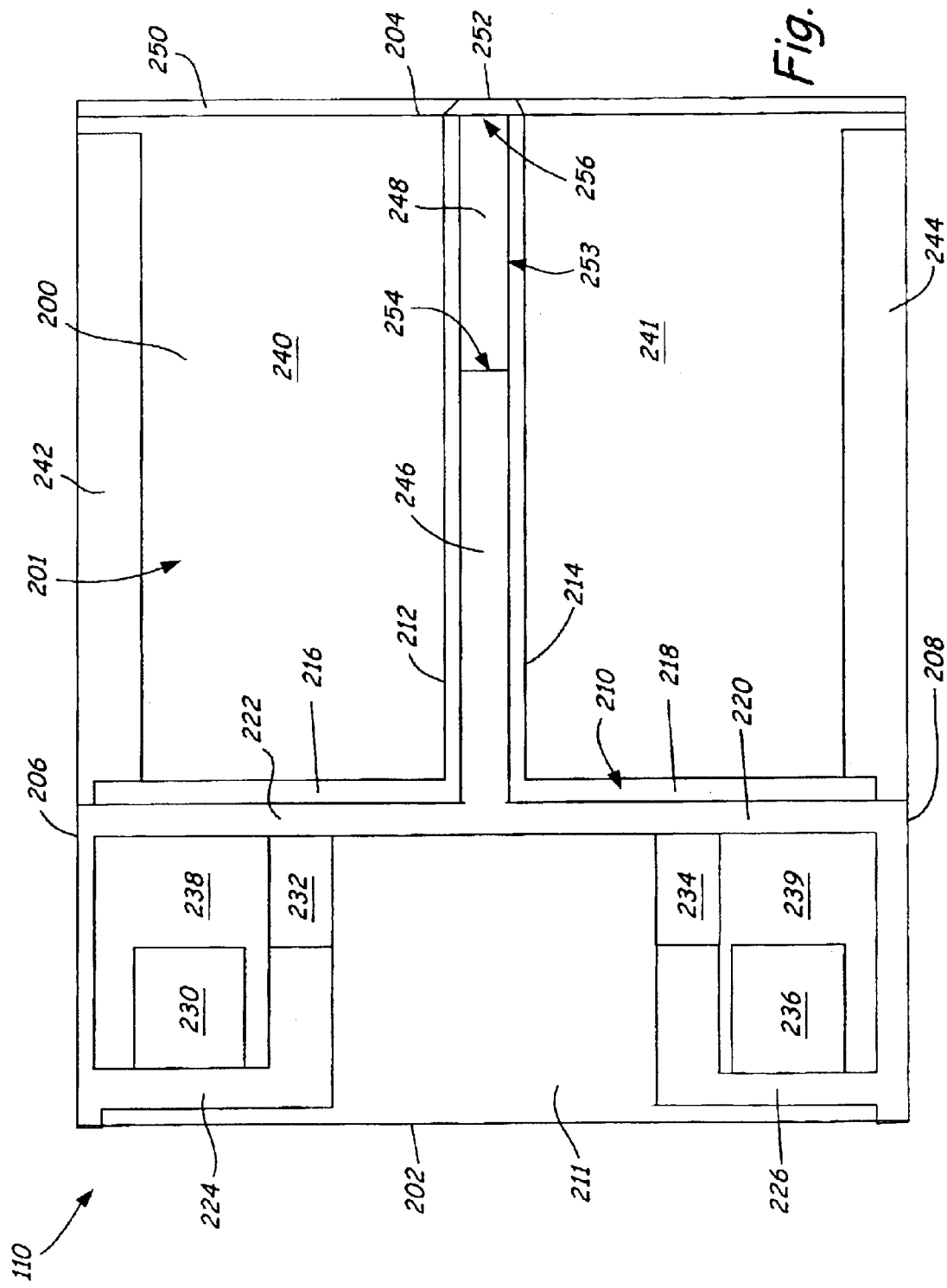
FIG. 2 is a plan view of a head slider according to one embodiment of the present invention.
Figure 3:
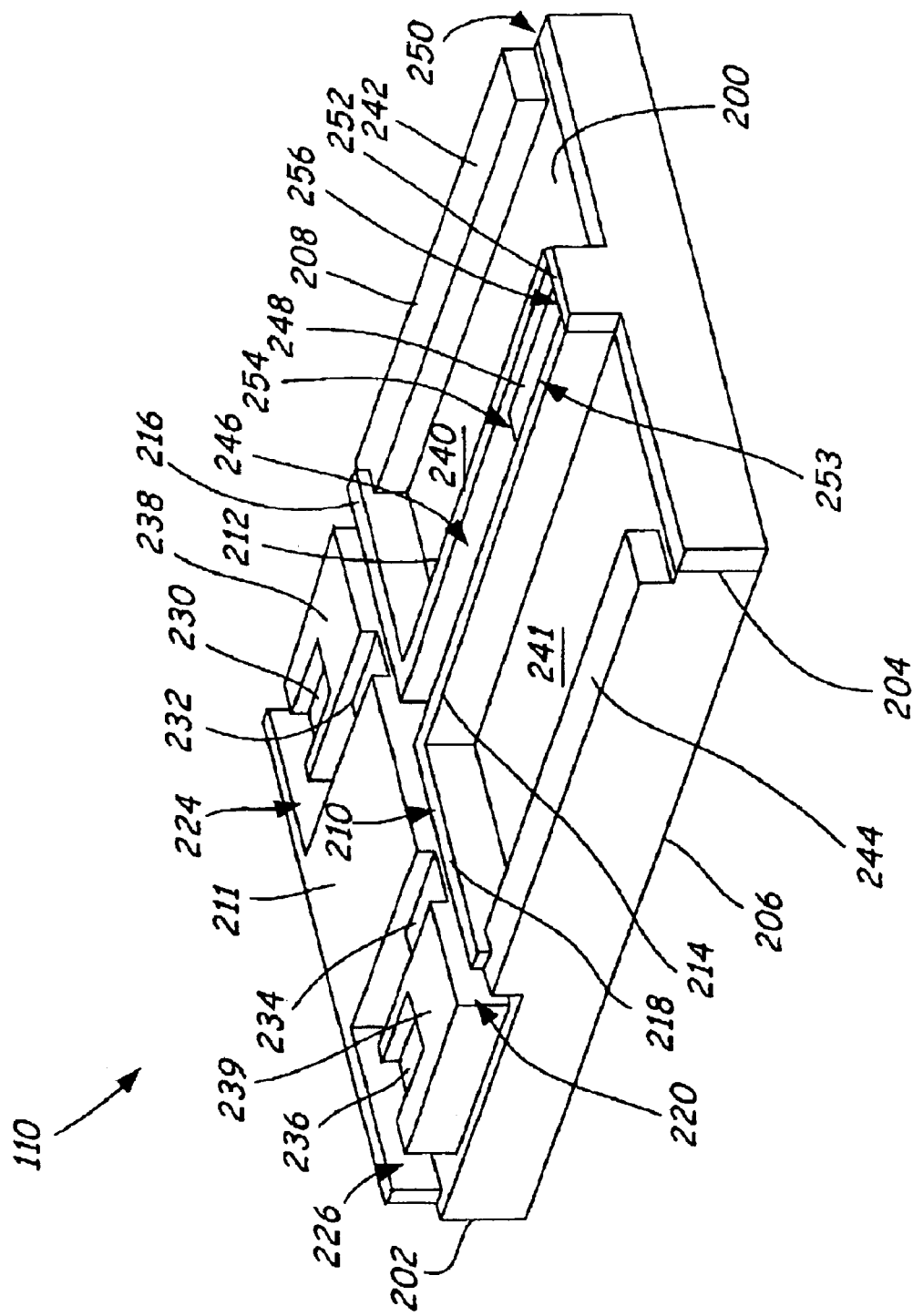
FIG. 3 is a perspective view of the slider in FIG. 2.

FIG. 2 is a plan view of slider 110 as viewed from the surface of disc 107 (FIG. 1), and FIG. 3 is a perspective view of slider 110 as viewed from the surface of a disc. The vertical dimensions are exaggerated in FIG. 3 for clarity. Slider 110 has a bearing surface geometry for reducing negative effects caused by pole tip recession. In particular, the bearing surface geometry focuses pressure on the transducer area itself to provide lift to slider 110. It should be pointed out that, although slider 110 is shown as being relatively flat, it is common for disc head sliders to include a slight curvature in their length and/or width directions. Such curvatures are commonly referred to as crown curvature and cross curvature. Accordingly, it is to be understood that the surfaces and planes described herein, including the bearing plane, may reflect slider crown and cross curvature, rather than being disposed in a perfectly flat plane.

For the purpose of the present description, references will be made to surfaces having a relative depth. It should be assumed that the described depths are measured from the bearing plane. Therefore, "depths" as terms used in the present description are generally measured from a plane that is generally coplanar with at least one described bearing surface. A surface having a deep or large depth will be further displaced from the bearing plane than a surface having shallow or small depth. A bearing surface will illustratively be assigned a depth value of zero.

Slider 110 has a slider substrate 200 having a disc-facing surface 201. Substrate 200 can be formed of any suitable material, such as an electrically conductive, ceramic substrate material such as $Al_2O_3$—TiC, TiC, Si, SiC, $ZrO_2$ or other composite materials and/or combinations thereof. Slider substrate 200 includes a leading edge 202, a trailing edge 204 and side edges 206 and 208. Leading edge 202 extends along a leading surface of substrate 200 and trailing edge 204 extends along a trailing surface of substrate 200.

Disc-facing surface 201 includes a cavity dam 210, a raised portion 211 and spaced-apart center walls 212 and 214 extending from cavity dam 210 toward trailing edge 204. Cavity dam 210 is formed of laterally extending walls 216 and 218. Illustratively, cavity dam 210 and center walls 212 and 214 have a depth of zero.

Raised portion 211 is positioned near leading edge 202. A trench 220 is formed within raised portion 211 and illustratively has a depth of about 1 to 3 microns. Trench 220 includes a U-shaped portion 222 (FIG. 2) that extends from side edge 206 to side edge 208 and toward leading edge 202 along side edges 206 and 208. Trench 220 also includes L-shaped portions 224 and 226 positioned near leading edge 202 of slider 110. A number of step regions 230, 232, 234 and 236 are formed within cavity dam 210 and illustratively have a "step" depth of about 0.1 to 0.5 microns. Raised portion 211 also includes leading bearing pads 238 and 239. These pads include leading step regions 230 and 236, which assist in pressurizing ambient air received from L-shaped trenches 224 and 226. Disc-facing surface 201 further includes cavities 240 and 241 that trail cavity dam 210 and illustratively have a depth of about 1 to 3 microns. Additionally, side walls 242 and 244 are provided along side edges 206 and 208 to contain subambient pressure within cavities 240 and 241 and illustratively have a step depth of about 0.1 to 0.5 microns.

A channel 246 extends from trench 220 toward trailing edge 204 and is positioned between center walls 212 and 214. Cavity dam 210, in particular lateral walls 216 and 218, block air flow from raised portion 211 and force air flow into channel 246. Channel 246 is of similar depth to trench 220. Other depths can also be used. A step region 248 is positioned between center walls 212 and 214 near trailing edge 204.

An end layer 250 is attached to trailing edge 204 and is illustratively comprised of a material different from substrate 200. End layer 250 includes a transducer layer and an overcoat layer as described below and is referred to as the transducer/overcoat layer. Generally, end layer 250 has a length of about 10–100 microns as measured in a direction from leading edge 202 toward trailing edge 204. A bearing pad 252 is formed substantially solely on end layer 250 and is positioned adjacent to and rearward of step region 248 near the center of the width of slider 110. As a result, pad 252 receives air flow from channel 246 and step region 248.

In the embodiment shown in FIGS. 2 and 3, a recessed convergent channel 253 is formed near trailing edge 204 wherein step region 248 is the channel floor. Generally, channel 253 has a leading end 254 open to fluid flow from channel 246 and a trailing end 256 closed to the fluid flow. Non-divergent walls, herein center walls 212 and 214, serve to funnel air flow towards trailing end 256. The airflow is confined by walls 212 and 214 and is forced to exit over pad 252, providing localized positive pressure, which is developed substantially solely on end layer 250. This localized pressure provides lift to slider 110. Together, channel 248 and convergent channel 253 provide sufficient air flow to pressurize pad 252.

Figure 4:
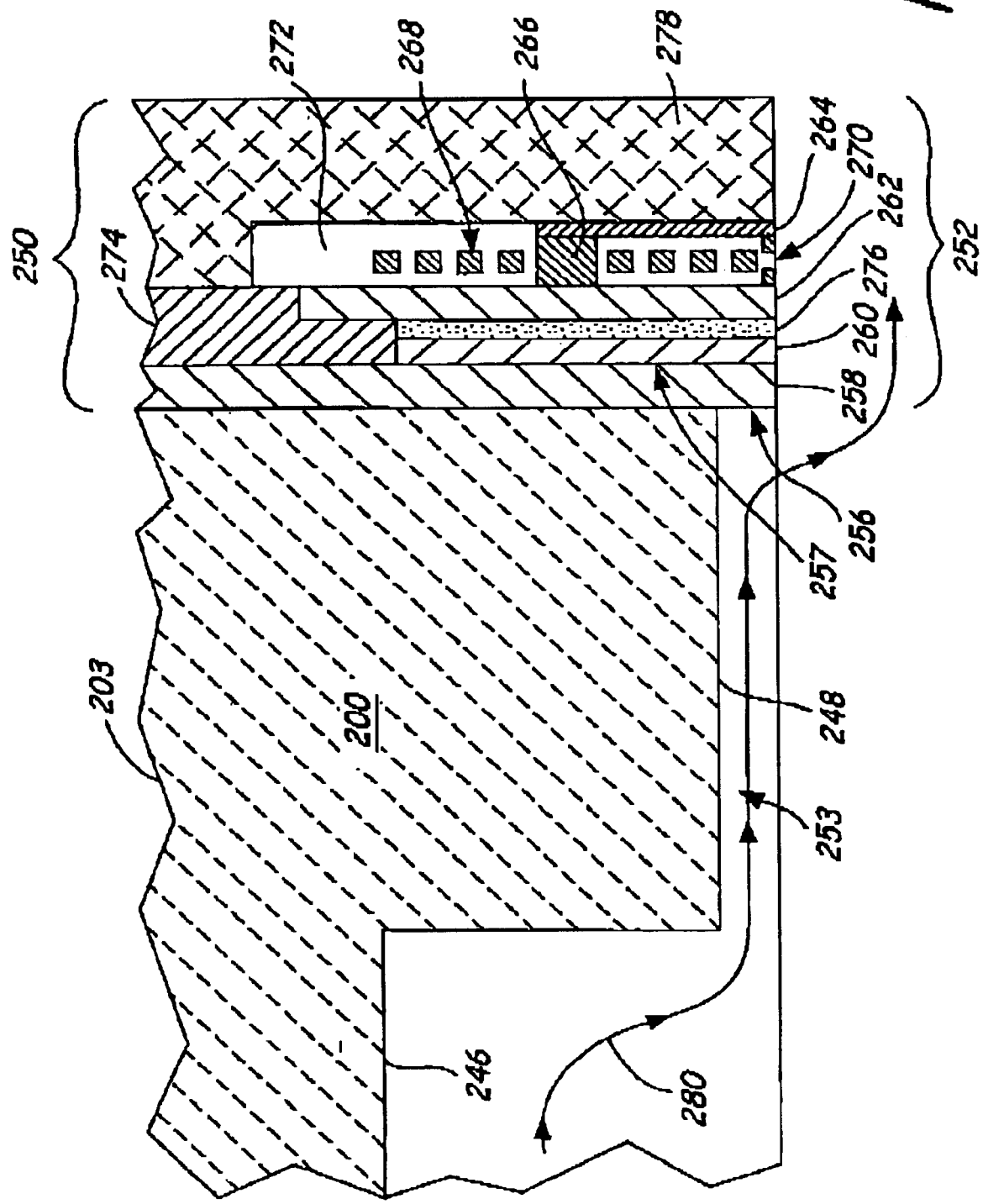
FIG. 4 is a cross-section of a portion of the slider in FIG. 2

FIG. 4, is a fragmentary, cross-sectional view taken along a center line of slider 110 including pad 252. End layer 250 includes a number of elements including a transducer, shown generally at 257. End layer 250 is deposited or otherwise affixed on the trailing surface of slider substrate 200. In one embodiment, basecoat layer 258 is deposited on substrate 200 and forms a bond with substrate 200. Basecoat layer 258 is an electrically insulating material such as Alumina, or $Al_2O_3$.

Deposited metallic magnetic layers, for example from alloys of iron (Fe), nickel (Ni), or cobalt (Co), form a lower shield 260, a shared pole 262, a top pole 264 and a core 266. Core 266 completes a write magnetic circuit through the center of a coil 268 and through a write gap 270. A coil insulator 272 serves to insulate coil 268.

An additional deposited insulating layer 274 fills the space around lower shield 260, and shared pole 262. Layer 274 is typically made from $Al_2O_3$ and forms a bond to basecoat layer 258.

A read sensor 276 is formed in a very thin layer between lower shield 260 and shared pole 262. Read sensor 276 is illustratively a magnetoresistive (MR) or giant magnetoresistive (GMR) sensor. Other types of read and write transducers may also be used in alternative embodiments of the present invention. For clarity, electrical leads and contacts, formed from Cu, Au, or other metals or metallic alloys in a conventional manner are not illustrated in FIG. 2.

An insulating overcoat or topcoat layer 278 is deposited on the top of the various elements of transducer 257. Overcoat layer 278 is typically also made from $Al_2O_3$. Additionally, overcoat layer 278 is planarized after deposition to expose electrical contacts (not illustrated) for the coil 268 and read sensor 276 in the transducer 257. Those skilled in the art will appreciate that other variations are available for end layer 250.

As mentioned above, pad 252 is formed substantially entirely on end layer 250. The air flow pattern through channel 246 and over pad 252 is shown generally by arrow 280. As a disc rotates, air flows into channel 246 and is forced into convergent channel 253. Within convergent channel 253, airflow 280 is confined by the channel side walls and by trailing end 256. Air flow 280 is forced over trailing end 256 and over pad 252. Compression of the air flow between pad 252 and the disc surface generates positive pressure, which counteracts the preload force supplied by the suspension and sets the height at which the pole tips of transducer 257 fly relative to the disc surface.

Since pad 252 is positioned substantially solely on end layer 250, recession of the various elements on end layer 250 has a substantially smaller effect on the flying height of slider 110, as measured near the pole tips. The magnitude of the positive pressure developed on pad 252 is not determined by the height of the pad, but by the surface area of the pad. Since the surface area is constant as pad 252 becomes recessed over time, the pressure generated by the pad and thus the flying height of the pad also remain constant. In particular, pole tip recession and effects on fly height due to thermal pole tip recession are estimated to be reduced by 95% and 70–80%, respectively, as compared to sliders having a significant amount of the trailing pad formed on the slider substrate material. Since pad 252 has a relatively small surface area compared to the overall slider, less air flow is needed to pressurize pad 252. As a result, slider 110 may be designed such that the operational pitch of slider 110 is reduced, which contributes to increased pitch and roll stiffness. As a result of the increased pitch and roll stiffness, gimbal torques have less of an effect on overall performance. Generally, torques are induced on a slider as the slider traverses between the inner diameter and the outer diameter of a disc. In one embodiment, negative effects due to gimbal torques are reduced by a factor of 2–4 times.

Figure 5:
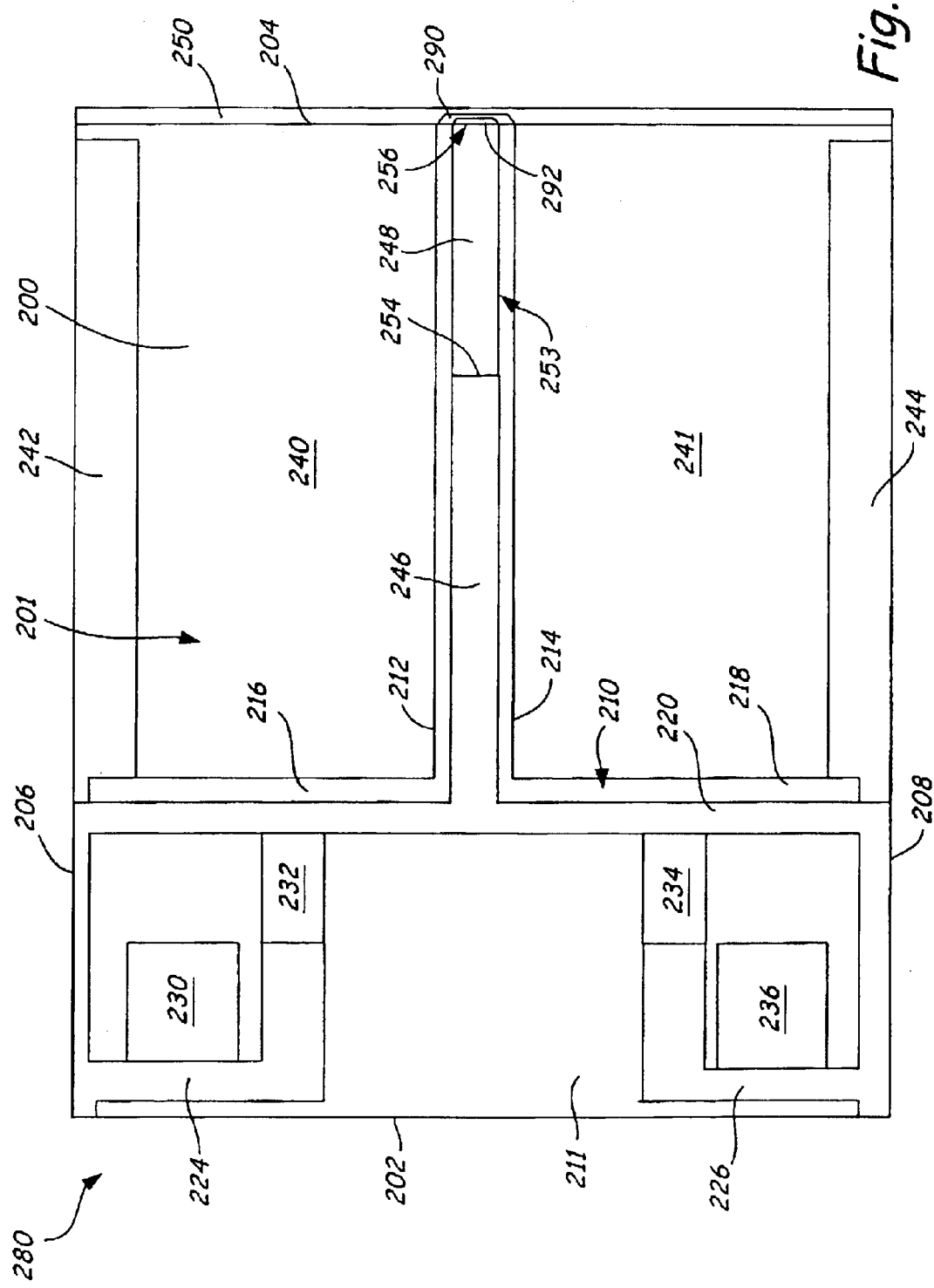
FIG. 5 is a plan view of a head slider according to an alternative embodiment of the present invention.

FIG. 5 is a bottom plan view of a slider 280 according to an alternative embodiment of the present invention. Like elements illustrated in FIGS. 2–4 are similarly numbered in FIG. 5. In this embodiment, a pad 290 protrudes towards the disc surface from the end layer 250 and is formed mainly of the poles of the transducer and substantially solely on end layer 250. Pad 290 is positioned adjacent to and rearward of channel 253 to receive fluid flow from channel 253. Pad 290 is U-shaped and is preceded by a recessed step region 292, which is formed from a portion of end layer 250. Recessed step region 292 is recess from pad 290 by the step depth of 0.1 to 0.5 microns, for example and is similar in depth to step region 248.

Figure 6:
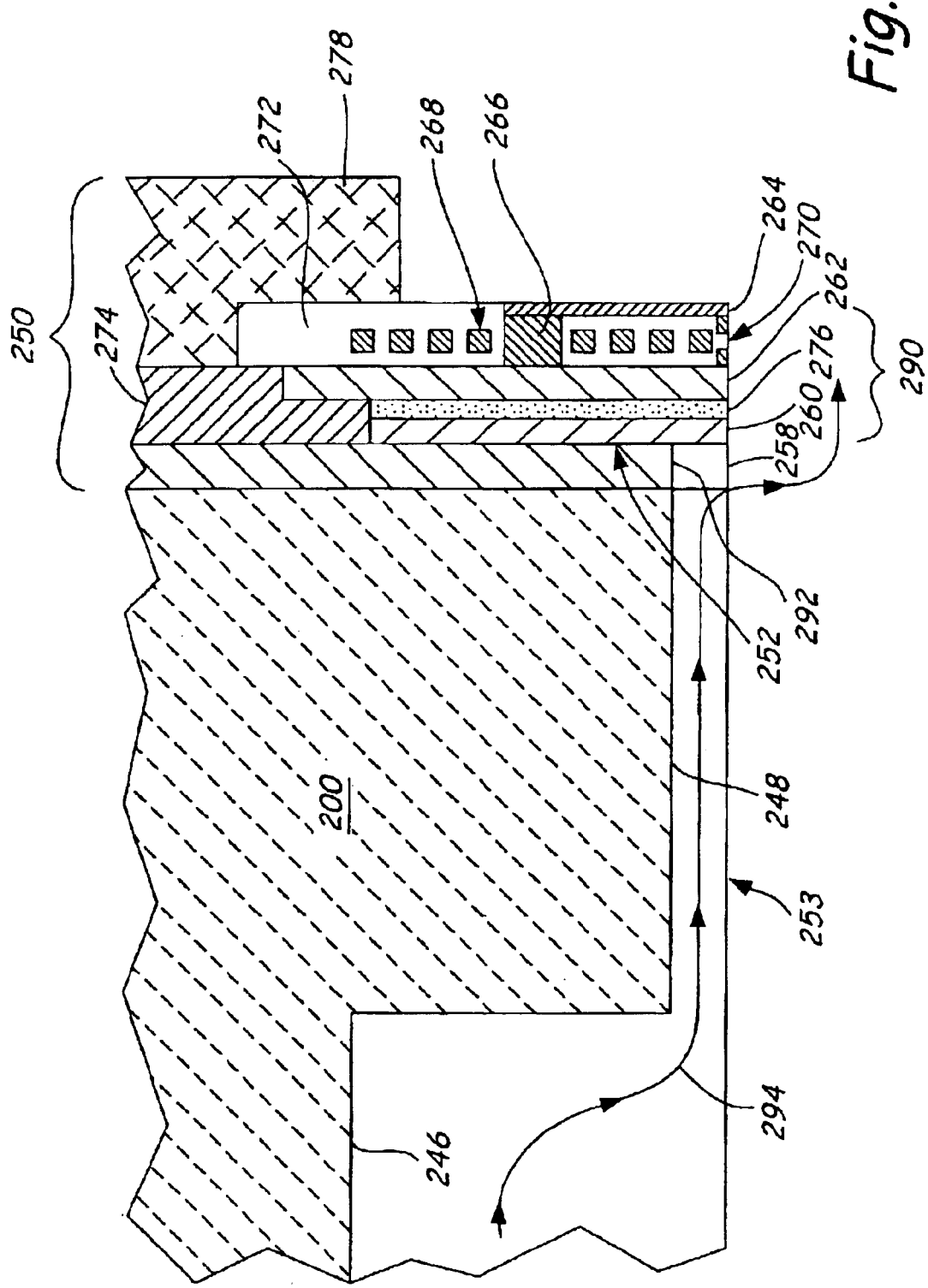
FIG. 6 is a cross-section of a portion of the slider in FIG. 5.

FIG. 6 is a fragmentary, cross-sectional view taken along the center line of the slider in FIG. 5. Pad 290 is formed mainly of transducer 257. In particular, pad 290 is formed of lower shield 260, shared pole 262, top pole 264, insulator 272 and sensor 276. Basecoat layer 258 includes step region 292 extending from step region 248. Air flow 294 travels from channel 246 where it is forced into convergent channel 253 and step region 292. When air flow 294 reaches the trailing end of convergent channel 253, it is forced over pad 290 where it becomes pressurized and provides lift to slider 280.

Using the embodiment of slider 280, pole tip recession and effects on fly height due to thermal pole tip recession are both estimated to be reduced by 95% as compared to sliders having a significant amount of the trailing pad formed on the slider substrate material. The designed operational pitch may also be reduced since the surface area of pad 290 is small, which leads to reduced negative effects from gimbal torque as discussed above. As a result, slider 280 can be used for disc drives that do not include active fly height control mechanisms. Generally, these drives are less expensive and fly height is only adjusted at the time of manufacture. Slider 280 may also be used with active fly height control mechanisms for improved disc drive performance.

Figure 7:
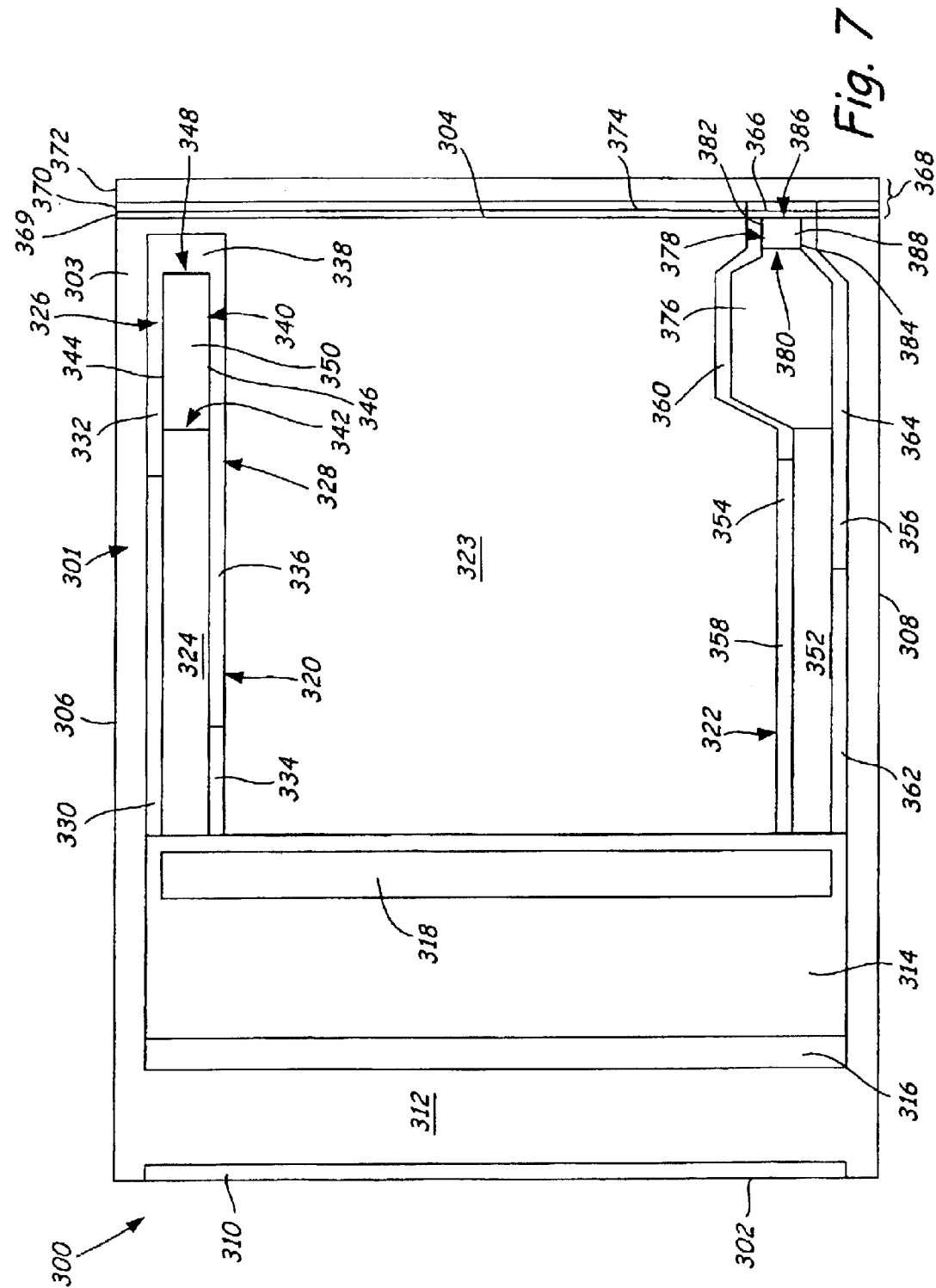
FIG. 7 is a plan view of a head slider according to a further alternative embodiment of the present invention.

FIG. 7 illustrates an alternative embodiment of a slider according to the present invention. Slider 300 is designed to operate in a manner similar to the operation of slider 110 described in relation to FIG. 1. Slider 300 includes a substrate 303 having a disc-facing surface 301. Substrate 303 can be formed of any suitable material, such as an electrically conductive, ceramic substrate material such as $Al_2O_3$—TiC, AlTiC, TiC, Si, SiC, $ZrO_2$ or other composite materials and/or combinations thereof. Substrate 303 includes a leading edge 302, a trailing edge 304 and side edges 306 and 308.

Disc-facing surface 301 includes a leading wall 310 that is positioned proximate leading edge 302. A trench 312 is positioned behind leading wall 310 and extends from side edge 306 to side edge 308. A dam 314 trails trench 312 and includes a step region 316 and a trench 318. Illustratively, wall 310 and dam 314 have a depth of zero. Trenches 312 and 318 are at a depth of about 1 to 3 microns while step region 316 is at a depth of about 0.1 to 0.5 microns. Disc-facing surface 301 also includes side rails 320 and 322. A subambient pressure cavity 323, having a depth of about 1 to 3 microns, is positioned between side rails 320 and 322 and trails dam 314.

Side rail 320 is a U-shaped rail having a recessed channel 324 and side walls 326 and 328 disposed on opposite sides of channel 324. Side wall 326 has a recessed leading step portion 330 and a trailing portion 332. Side wall 328 includes a recessed leading step portion 334 and a trailing portion 336. Trailing portions 332 and 336 join to form a trailing pad 338. Channel 324 has a depth of about 1 to 3 microns. Generally, leading step portions 330 and 334 are recessed from trailing portions 332 and 336. In one embodiment, step portions 330 and 334 are recessed at a depth of 0.3 microns while trailing portions 332 and 336 and trailing pad 338 are recessed at a depth of 0.1 microns. Other depths may also be used.

A convergent channel 340 is formed in the trailing end of rail 320. Convergent channel 340 includes a leading channel end 342, channel side walls 344 and 346, a trailing channel end 348 and a channel floor 350. Leading channel end 342 is open to fluid flow from channel 324. Channel side walls 344 and 346 and trailing channel end 348 are closed to the fluid flow, thereby forming the convergent nature of the channel and forcing fluid flow over trailing pad 338. Channel floor 350 has a depth of about 0.3 microns, although other depths may be used.

Side rail 322 includes a recessed channel 352 and side walls 354 and 356 disposed on opposite sides of channel 352. Channel 352 has a depth of about 1–3 microns. Side wall 354 includes a recessed leading step portion 358 and a trailing portion 360. Side wall 356 includes a recessed leading step portion 362 and a trailing portion 364. In one embodiment, step portions 358 and 362 have a depth of about 0.3 microns and trailing portions 360 and 364 have a depth of about 0.1 microns. Trailing portions 360 and 364 join with a trailing pad 366. Trailing pad 366 is formed substantially solely on an end layer 368. End layer 368 is attached to slider body 303 at trailing edge 304 and includes a basecoat layer 369, transducer layer 370 and overcoat layer 372. Trailing pad 366 is formed mostly on transducer layer 370 and has a depth of zero. The remaining portion 374 of transducer layer 370 is recessed at a similar depth to cavity 323, or a depth of about 1 to 3 microns relative to pad 366.

A step region 376 and a convergent channel 378 are formed within rail 322. Step region 376 receives fluid flow from channel 352 and fluid flows from step region 376 to channel 378. Pad 366 is positioned adjacent to and rearward of channel 378. Channel 378 includes a leading channel end 380, side walls 382 and 384, a trailing channel end 386 and a channel floor 388. Leading channel end 380 is open to fluid flow from step region 376 and channel 352. Channel side walls 382 and 384 and trailing channel end 386 are closed to the fluid flow, thereby forming the convergent nature of the channel and forcing fluid flow over trailing pad 366. The fluid flow thus pressurizes pad 366 and provides lift to slider 300. Channel floor 388 has a depth of about 0.3 microns, although other depths may be used. Additionally, step region 376 may be at a similar depth or different from step channel floor 388.

Figure 8:
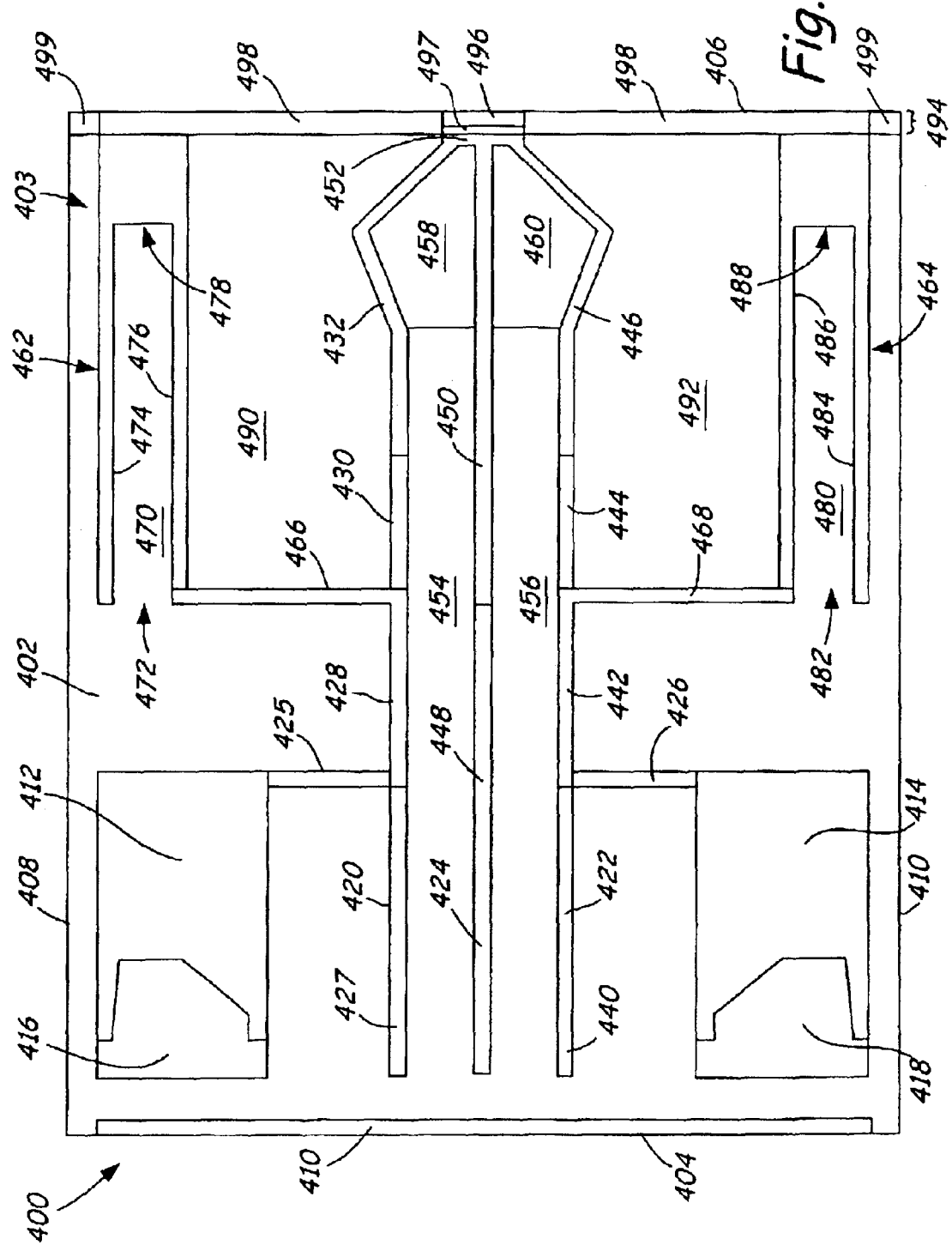
FIG. 8 is a plan view of a head slider according to a further alternative embodiment of the present invention.

FIG. 8 illustrates a slider 400 according to another alternative embodiment of the present invention. Slider 400 is designed to operate in a manner similar to operation of slider 110 described in relation to FIG. 1. Slider 400 includes a substrate 402 having a disc facing surface 403. Substrate 402 can be formed of any suitable material, such as an electrically conductive, ceramic substrate material such as $Al_2O_3$—TiC, AlTiC, TiC, Si, SiC, $ZrO_2$ or other composite materials and/or combinations thereof. Substrate 402 includes a leading edge 404, trailing edge 406 and side edges 408 and 410.

Disc facing surface 403 includes a leading wall 410 that is positioned proximate leading edge 404. Two leading pads 412 and 414 are positioned behind leading wall 410. Leading pads 412 and 414 include step surfaces 416 and 418, respectively. In one embodiment, leading wall 410 and leading pads 412 and 414 protrude from a bearing plane by about 0.002 microns. Step surfaces 416 and 418 have a depth of about 0.148 microns. Pads 412 and 414 pressurize slider 400 and contribute to providing an operational pitch for slider 400.

Slider 400 further includes inner side walls 420 and 422 and a center wall 424. A lateral wall 425 extends from inner side wall 420 to a trailing end of pad 412. Likewise, a further lateral wall 426 extends from inner side wall 422 to a trailing end of pad 414. Inner side wall 420 includes a leading step portion 427, a protruding middle portion 428, a recessed middle portion 430 and a trailing portion 432. Inner side wall 422 is similarly constructed and includes leading portion 440, protruding middle portion 442, recessed middle portion 444 and trailing portion 446. Center wall 424 includes a leading protruding portion 448 and a trailing portion 450. Trailing portions 432, 446 and 450 join near trailing edge 406 to form a trailing recessed surface pad 452. Trailing portions angle outwards toward side edges 408 and 410, respectively, before angling towards and joining with recessed surface pad 452. In one embodiment, lateral walls 425 and 426, leading step portion 427, recessed middle portion 430, leading step portion 440 and recessed middle portion 444 all have a similar depth of about 0.148 microns. Protruding middle portions 428 and 442 as well as leading protruding portion 448 protrude above the bearing plane by about 0.002 microns. Trailing portions 432, 446 and 450 and recessed pad 452 all have a depth of about 0.016 microns. Other depths may be used in alternative embodiments.

A channel 454 is positioned between inner side wall 420 and center wall 424. A similar channel 456 is positioned between inner side wall 422 and center wall 424. A step region 458 is positioned between inner side wall 420 and center wall 424 and another step region 460 is positioned between inner side wall 422 and center wall 424. Step regions 458 and 460 are positioned at a trailing end of channel 454 and 456, respectively. The step regions 458 and 460 start at a point where trailing portions 432 and 446 angle towards side edges 408 and 410, respectively. Channels 454 and 456 illustratively have a depth of 4 microns and step regions 458 and 460 have a depth of 0.148 microns.

A side rail 462 is positioned near side edge 408 and a further side wall 464 is positioned near side edge 410. A lateral wall 466 extends from inner side wall 420 to rail 462. A further lateral wall 468 extends from inner side wall 422 to rail 464. Side rail 462 is U-shaped and includes a recessed channel 470. Channel 470 includes a leading channel end 472, channel side walls 474 and 476 and a trailing end 478. Leading channel end 472 is open to fluid flow while channel side walls 474 and 476 and trailing end 478 are closed to the fluid flow. Side rail 464 is also U-shaped and includes a recessed channel 480. Channel 480 further includes a leading channel end 482, channel side walls 484 and 486 and a trailing end 488. Leading channel end 482 is open to fluid flow and channel side walls 484 and 486 and trailing channel end 488 are closed to fluid flow. A recessed area 490 is positioned between side rail 462 and inner side wall 420 and behind lateral wall 466. Additionally, a recessed area 492 is positioned between side rail 464 and inner side wall 422 and behind lateral wall 408. Although other depths may be used, lateral walls 466 and 468 protrude above the bearing plane by 0.002 microns. Rails 462 and 464 have depths of 0.148 microns and channels 470 and 480 have depths of 4 microns. Recessed areas 490 and 492 have a similar depth of 1.951 microns.

An end layer 494 is attached to substrate 402 and includes a pad 496 formed substantially solely thereon. End layer 494 is similar in construction to end layer 250 in FIGS. 2–4. Pad 496 illustratively is formed of the transducer pole tips in the illustrated embodiment, but other variations may be used. Pad 496 is positioned adjacent to and rearward of the trailing recessed pad 452 to receive fluid flow therefrom. Additionally, a portion 497 of end layer 494 is recessed forward of pad 496. Lateral portions 498 and corner portions 499 are also recessed relative to pad 496. Pad 496 is coplanar with the bearing plane and recessed portion 497 has a depth similar to recessed trailing pad 452 of about 0.016 microns. Lateral portions 498 have a depth of 1.951 microns and corner portions 499 have a depth of 4 microns.

It is worth noting that the embodiments discussed above experience reduced sensitivity to roll, pitch and preload by about 2 to 4 times. Additionally, the sliders are about 2.5 times less sensitive to pole tip recession and thermal pole tip recession.

In summary, a head slider (110, 280, 300, 400) is provided that includes a substrate (200, 303, 402) having a leading surface, a trailing surface, first and second side edges (206 and 208, 306 and 308, 408 and 410), a back surface and a disc-facing surface (201, 301, 403) opposite the back surface. The disc-facing surface (201, 301, 403) includes a bearing plane and a recessed area (248, 253, 292, 378, 388, 452, 497) recessed from the bearing plane. An end layer (250, 368, 494) is attached to the trailing surface of the substrate (200, 303, 402). The end layer (250, 368, 494) includes a bearing pad (252, 290, 366, 496) formed substantially solely on the end layer (250, 354, 494) that is generally parallel to the bearing plane. The bearing pad (252, 290, 366, 496) is positioned adjacent to and rearward of the recessed area (248, 253, 292, 378, 388, 452, 497) to receive fluid flow from the recessed area (248, 253, 292, 378, 388, 452, 497).

In addition, a head slider (110, 280, 300, 400) includes a front portion (200, 303, 402) including a first material and having a bearing plane and a recessed area (248, 253, 378, 388, 452, 497) recessed from the bearing plane. A rear portion (250, 368, 494) is attached to the front portion (200, 303, 402) and includes a second material different from the first material. The rear portion (250, 368, 494) also includes a pad (252, 290, 366, 494) positioned adjacent to and protruding from the recessed area (248, 253, 292, 378, 388, 452, 497) to receive airflow from the recessed area (248, 253, 292, 378, 388, 452, 497).

Also, a head slider (110, 280, 300) has a substrate (200, 303) that includes a leading edge (202, 302), a trailing edge (204, 304), a back surface and a disc-facing surface (201, 301) opposite the back surface. The disc-facing surface (201, 301) has a bearing plane. A recessed convergent channel (253, 378) is positioned on the disc-facing surface (201, 301) and recessed from the bearing plane. The convergent channel (253, 378) includes an end open to fluid flow and side walls coplanar with the bearing plane. A basecoat/transducer/overcoat layer (250, 368) is attached to the substrate (200, 303) at the trailing edge (204, 304). Additionally, a pad (252, 290, 366) is formed substantially solely on the basecoat/transducer/overcoat layer (250, 368) and coplanar with the bearing plane. The pad (252, 290, 366) is closed to fluid flow from the recessed convergent channel (253, 378).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive system while maintaining substantially the same functionality without departing from the scope and spirit of the present invention. In addition, although the embodiments described above are directed to self-loading type sliders, it will be appreciated by those skilled in the art that the teachings of the present invention can be applied to positive-pressure type air bearing sliders (PPABs) without departing from the scope and spirit of the present invention. Also, each embodiment can be configured as a read/write slider having a read/write head or as a glide head slider having one or more contact-sensing transducers for example. Additionally, surfaces can have various relative depths and various vertical profiles such as tapers, for example.

What is claimed is:

1. A head slider comprising:
   a substrate having a leading surface, a trailing surface, first and second side edges, a back surface and a bearing surface opposite the back surface, wherein the bearing surface includes a bearing plane and a recessed area recessed from the bearing plane; and
   an end layer attached to the trailing surface of the substrate, the end layer including a bearing pad formed substantially solely on the end layer and generally parallel to the bearing plane, wherein the bearing pad is positioned adjacent to and rearward of the recessed area to receive fluid flow from the recessed area.

2. The head slider of claim 1 and further comprising a convergent channel including a leading end, side walls, a trailing end and a channel floor, wherein the channel floor forms the recessed area, wherein the leading end is open to fluid flow and the trailing end is closed to the fluid flow, and wherein the bearing pad is positioned adjacent to and rearward of the trailing end.

3. The head slider of claim 2 wherein the side walls are non-divergent as the side walls extend toward the end layer.

4. The head slider of claim 3 wherein the non-divergent side walls are coplanar with the bearing plane.

5. The head slider of claim 1 wherein the end layer comprises a transducer layer, and a portion of the transducer layer forms a portion of the bearing pad.

6. The head slider of claim 1 wherein a portion of the bearing pad includes an alumina overcoat layer.

7. The head slider of claim 1 wherein the bearing pad includes a shield protruding from the end layer.

8. The head slider of claim 7 wherein the end layer includes a recessed area forward of the shield.

9. The head slider of claim 1 wherein the recessed area includes a step region at a first depth and a channel at a second depth, greater than the first depth, wherein the channel is positioned closer to the leading edge than the step region.

10. The head slider of claim 1 wherein the bearing pad is positioned near a center of a width of the slider.

11. The slider of claim 1 wherein the bearing pad is positioned near one of the first and second side edges.

12. The head slider of claim 1 wherein the bearing pad is U-shaped.

13. The head slider of claim 1 wherein the recessed area is at a depth of about 0.1 to 0.5 microns.

14. The head slider of claim 1 wherein the bearing pad is coplanar with the bearing plane.

15. A head slider comprising:
- a front portion including a first material and having a bearing plane and a recessed area recessed from the bearing plane; and
- a rear portion attached to the front portion and including a second material different from the first material and including a pad positioned adjacent to and protruding from the recessed area to receive airflow from the recessed area.

16. The head slider of claim 15 wherein the recessed area is a convergent channel, the channel including non-divergent side walls formed on the front portion and connected to the bearing pad.

17. The head slider of claim 16 wherein the side walls are coplanar with the bearing plane.

18. The head slider of claim 15 wherein the recessed area includes a step region at a first depth and a channel at a second depth, greater than the first depth, wherein the channel is positioned closer to the leading edge than the step region.

19. The head slider of claim 15 wherein the recessed area is recessed from the bearing plane by about 0.1 to 0.5 microns.

20. The head slider of claim 15 wherein the pad is U-shaped.

21. The head slider of claim 15, wherein the first material is at least one of $Al_2O_3$—TiC, AlTiC, TiC, Si, SiC, $ZrO_2$.

22. The head slider of claim 15 wherein the second material at least partially comprises alumina.

23. A head slider comprising:
- a substrate including a leading edge, a trailing edge, a back surface and a bearing surface opposite the back surface, the bearing surface having a bearing plane;
- a recessed convergent channel positioned on the bearing surface and recessed from the bearing plane, wherein the convergent channel includes a leading end open to fluid flow, side walls coplanar with the bearing plane and trailing end closed to the fluid flow;
- a basecoat/transducer/overcoat layer attached to the substrate along the trailing edge; and
- a pad formed substantially solely on the basecoat/transducer/overcoat layer and coplanar with the bearing plane, the pad being positioned adjacent to and rearward to the trailing end of the convergent channel.

24. The head slider of claim 23 and further comprising a recessed area positioned on the bearing surface closer to the leading edge than the convergent channel, wherein the convergent channel is at a first depth and the recessed area is at a second depth, greater than the first depth.

* * * * *